Feb. 26, 1952    C. BARTSCH    2,587,092
SELF-LOADING EXCAVATOR
Filed Nov. 10, 1949    2 SHEETS—SHEET 2

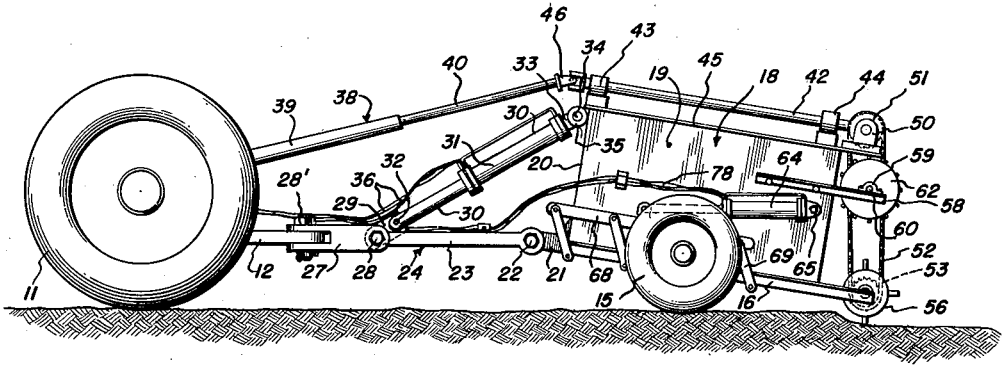

Inventor
CORNELIUS BARTSCH

By McMorrow, Berman & Davidson
Attorneys

Patented Feb. 26, 1952

2,587,092

UNITED STATES PATENT OFFICE 2,587,092

SELF-LOADING EXCAVATOR

Cornelius Bartsch, Dinuba, Calif.

Application November 10, 1949, Serial No. 126,595

3 Claims. (Cl. 37—4)

1

My invention relates to an excavating or scraping machine.

An important object of my invention is to provide an excavating or scraping machine which may be drawn along by a tractor or the like, and including a rotary scraping element driven by the power take-off shaft of the tractor.

A further object is to provide a scraping machine of the above-mentioned character including a body or bucket which will be automatically loaded as the machine travels forwardly.

A further object is to provide a scraping machine having means operated by the hydraulic system of the tractor for dumping or discharging the load when the body of the scraper is filled.

A still further object of the invention is to provide a device of the above-mentioned character which is highly simplified, compact, sturdy and relatively cheap to manufacture.

Other objects and advantages of my invention will be apparent during the course of the following description.

In the accompanying drawings forming a part of this application, and in which like numerals are employed to designate like parts throughout the same:

Figure 1 is a side elevation of a scraping or excavating machine embodying my invention;

Figure 2 is a plan view of the same;

Figure 3:
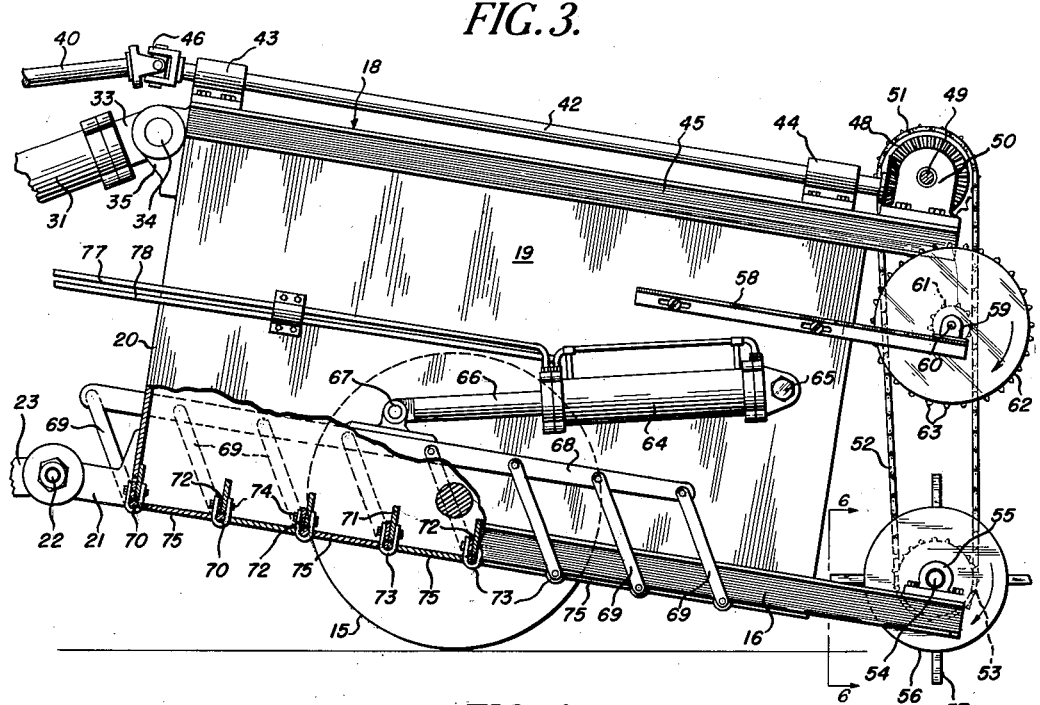
Figure 3 is an enlarged fragmentary side elevation of the machine, parts in section.

In the drawings, where, for the purpose of illustration, is shown a preferred embodiment of my invention, the numeral 10 designates the rear end portion of a conventional tractor, including traction wheels 11, and having the usual drawbar 12. The tractor is equipped with the usual rotary power take-off shaft 13, and includes pipes or conduits 14 forming a part of the usual hydraulic system of the tractor.

The scraping machine embodying the invention to be drawn at the rear of the tractor comprises a pair of ground engaging wheels 15 supporting a horizontal frame including side rails 16 which extend longitudinally and generally horizontally inwardly of the wheels 15. The side rails 16 may be rigidly connected at their forward ends by a forward, transverse, horizontal rail 17 rigidly secured thereto by welding or the like. Rigidly

2 mounted upon the side rails 16 and forward rail 17 of the frame is a rectangular body or scraper bucket 18, open at its top and rear end, and including vertical sides 19 and a forward, vertical end 20. The side rails 16 extend longitudinally rearwardly of the open rear end of the body 18, as shown.

Rigidly secured to the lower, forward corners of the body 18 by welding or the like are forwardly projecting brackets 21 pivotally connected, as at 22, with the rear ends of forwardly converging, horizontal arms 23 of a tongue 24. The forward ends of the arms 23 are provided with longitudinal, short extensions 25 engaging between knuckles 26 of a link 27. The extensions 25 are pivotally connected with the knuckles 26, as shown at 28, and the forward end of the link 27 is pivotally connected with the rear end of the drawbar 12, as at 28'. A vertical plate 29 is pivotally mounted upon the pin 28 between the extensions 25, and an upwardly inclined plunger rod 30 of a hydraulic cylinder 31 has its lower end pivotally connected with the plate 29, as shown at 32. The top end of the cylinder 31 is provided with an apertured lug 33 pivotally connected, as at 34, with a mounting bracket or bearing 35, rigidly mounted upon the forward end 20 of the body 18 adjacent the top of the body and at the transverse center thereof. Flexible hydraulic lines 36 lead from a hydraulic gland 37 of the tractor to the inlet and exhaust fittings of the cylinder 31.

An inclined, longitudinally extending drive shaft 38 is provided, and formed in two telescoping sections 39 and 40. The forward drive shaft section 39 is connected with the power take-off shaft 13 of the tractor through a universal joint 41. A horizontal, longitudinally extending shaft 42 is arranged adjacent and above one side 19 of the body 18, and journaled in forward and rear bearings 43 and 44, in turn rigidly mounted upon a top longitudinal rail or bar 45 secured to the top of the adjacent side 19. The forward end of the shaft 42 is operatively connected with the shaft section 40 through a universal joint 46. Rearwardly of the bearing 44, the shaft 42 carries a bevel gear 47, meshing with a bevel gear 48 mounted upon a transverse horizontal shaft 49 for rotation therewith. The shaft 49 is journaled near its opposite ends in bearings 50, rigidly mounted upon the rear ends of the bars or rails 45 which project rearwardly longitudinally of the rear end of the body 18, as shown. The shaft 49 is arranged at the same elevation as the shaft 42. Outwardly of the bevel gear 48, and outwardly of the bearing 50, the shaft 49 has mounted upon it for rotation therewith a sprocket wheel 51 having trained over it a generally vertically arranged sprocket chain 52 which extends downwardly for engagement upon a lower sprocket wheel 53 mounted upon a lower, transverse, horizontal, rotatable shaft 54 for rotation therewith. The shaft 54 is spaced rearwardly of the rear end of the body 18, and journaled near its opposite ends in bearings 55 rigidly mounted upon the rear ends of the side rails 16, as shown. The shaft 54 is, therefore, arranged substantially adjacent the bottom of the body 18.

Figure 6:
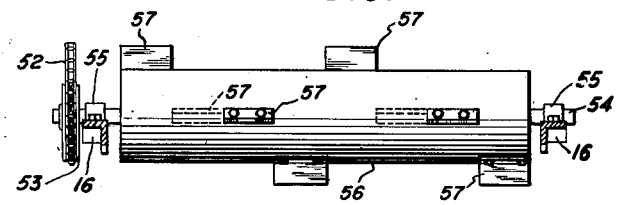
Figure 6 is a side elevation of a scraper cylinder removed taken on the line 6—6 of Figure 3.

Mounted upon the shaft 54 between the bearings 55 for rotation with it is a cylindrical scraper drum 56 having a plurality of radially arranged, flat scraper blades 57, arranged in longitudinally spaced and staggered relation, as shown, so that when the drum 56 rotates, the blades 57 will scrape the ground for substantially the entire length of the drum 56, Figure 6.

Mounted upon the sides 19 near and below the tops of the same are longitudinally extending bars or arms 58 which project rearwardly longitudinally of the rear open end of the body 18. Rigidly mounted upon the rear ends of the arms 58 are bearings 59 within which is journaled a transverse, rotatable shaft 60, having a relatively small sprocket wheel 61 mounted thereon for rotation therewith and adapted to engage the sprocket chain 52 to be driven thereby. Mounted upon the shaft 60 for rotation therewith, and arranged between the arms 58, is a large cylinder or drum 62, provided with a plurality of radially extending lugs or pins 63. The arrangement is such that the cylinder or drum 62 is driven simultaneously with the drum 56 and in the same direction, both elements being driven clockwise, as shown in Figure 3.

Figure 4:
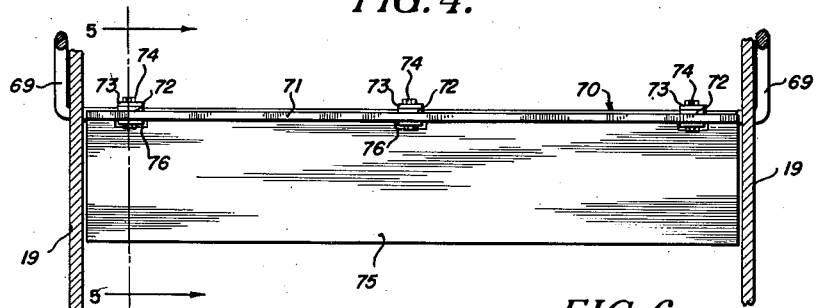
Figure 4 is an enlarged fragmentary plan view of a portion of the bottom of the machine, parts in section and parts broken away.
Figure 5:
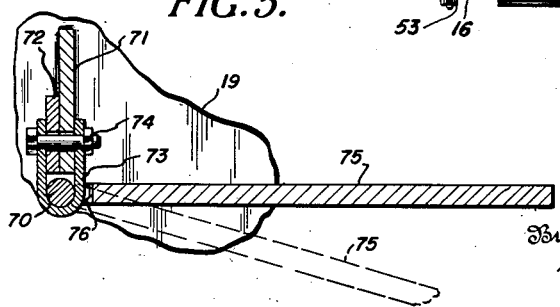
Figure 5 is an enlarged transverse vertical section taken on line 5—5 of Figure 4.

Means are provided for dumping the contents of the body 18 after the same becomes filled. Such means comprises a pair of hydraulic cylinders 64 arranged adjacent the outer faces of the sides 19 and pivotally connected at their rear ends, as shown at 65, to such sides. The cylinders 64 may pivot vertically about their pivots 65, and are provided with forwardly extending piston rods 66, in turn pivotally connected at their forward ends 67 with longitudinally shiftable links or bars 68, which lie adjacent the outer sides of the sides 19. The bars 68 are pivotally connected at longitudinally spaced intervals with the tops of side, upstanding extensions 69 of transversely extending U-shaped rods 70. The rods 70 lie adjacent the bottom edges of the sides 19 of the body, and the rods extend for substantially the entire width of the body 18, the upstanding extensions 69 being disposed adjacent the outer faces of the sides 19. Longitudinally spaced, transverse, vertical plates 71 extend between the sides 19 adjacent the lower edges thereof, and are rigidly secured at their opposite ends by welding or the like to the sides 19. The plates 71 are disposed adjacent the transverse rods 70, and directly above the same, Figure 3. The plates 71 are provided on one side, and at spaced intervals with small spacer plates or blocks 72 rigidly secured thereto by welding or the like. U-shaped straps or brackets 73 are secured to the bottoms of the plates 71 by bolts 74 or the like. The U-shaped straps 73 project below the bottoms of the plates 71 and receive therein the transverse, U-shaped rods 70, for rocking or pivoted movement. The rods 70 have separate, flat, horizontal bottom plates or slats 75 rigidly secured to them by welding or the like, and extending for substantially the entire length of the rods 70. The opposite ends of the plates or slats 75 are disposed close to the inner faces of the sides 19, Figure 4. The plates 75 are provided at spaced intervals with notches 76, providing clearance for the plates 75 to swing vertically about the U-shaped straps 73, Figure 5. When the plates 75 are arranged in their elevated or horizontal positions, Figure 3, they constitute a substantially continuous, flat, horizontal bottom for the body 18. The trailing edge of each plate 75 substantially contacts the forward side of the adjacent rod 70, as shown. The arrangement is such that the plates 75 swing vertically in unison when the bars 68 are shifted longitudinally by the plunger rods 66. Flexible hydraulic conduits 77 and 78 are connected with the inlet and exhaust fittings of the hydraulic cylinders 64, and extend forwardly for connection with the gland 37 of the hydraulic system of the tractor.

The operation of the scraper is as follows:

With the device connected at the rear of a tractor, as shown and described, rotation may be imparted to the power take-off shaft 13 in the usual manner. This will cause the telescoping shaft 38 to rotate, driving the shaft 42, shaft 49 and sprocket chain 52. This will cause the cylinders 56 and 62 to rotate clockwise, as shown in Figure 3.

Pressure is introduced into the hydraulic cylinder 31, which causes its plunger rod 30 to extend for tilting the forward end of the body 18 upwardly to the inclined position shown in Figures 1 and 3. This brings the blades 57 of the cylinder 56 into contact with the ground. As the tractor travels forwardly, the blades 57 will scrape or scoop up the dirt and propel the same forwardly through the open rear end of the body 18 and upon the bottom of such body. At this time, pressure is also applied within the cylinders 64, and the piston rods 66 thereof are in their extended positions, Figure 3, and the plates 75 forming the bottom of the body 18 are maintained elevated or closed. The scraping operation may thus continue until the body 18 is substantially filled with dirt or the like.

When the body 18 is filled, and it is desired to dump the same, the pressure within the cylinder 31 may be exhausted, and the forward end of the body 18 tilted downwardly to a substantially horizontal position. The telescoping shaft 38 permits this vertical swinging movement of the body 18. When the forward end of the body has been tilted downwardly, the scraping cylinder 56 will be elevated and the blades 57 thereof will move out of engagement with the ground. In order to dump the contents of the body 18, it is merely necessary to exhaust the pressure from the hydraulic cylinders 64, and the weight of the contents of the body upon the individual plates or slats 75 will swing them downwardly to release or dump the dirt below the body 18. Obviously, when the plates 75 swing downwardly, the U-shaped rods 70 turn with them and the bars or rods 68 are shifted longitudinally rearwardly, forcing the plunger rods 66 into the cylinders 64. As soon as pressure is again applied within the cylinders 64, the plunger rods 66 will return to their extended positions for closing the plates 75 of the bottom of the body. Pressure may simultaneously be again applied within the cylinder 31, and the forward end of the body 18 will tilt upwardly, the cylinder 56 being again lowered into its scraping or operative position, Figure 1.

The scraping machine is highly simplified, compact, easy to operate and extremely strong and durable. It may be used with various makes of conventional tractors equipped with power take-off shafts and hydraulic systems. While I have shown and described the cylinder 62, which serves to propel any dirt into the housing 18 which may be tossed too high by the scraper cylinder 56, I may omit the cylinder 62 in certain cases. Also, I contemplate omitting one of the hydraulic cylinders 64 which operate the plates 75. While I have shown the scraping machine as embodying a two-wheeled frame or body, I also contemplate building the same in larger models, equipped with four wheels and a self-contained power plant for propelling the machine.

It is to be understood that the form of the invention herewith shown and described is to be taken as a preferred example of the same, and that various changes in shape, size and arrangement of parts may be resorted to without departing from the spirit of my invention or the scope of the subjoined claims.

Having thus described my invention, I claim:

1. A scraping machine for use with a tractor having a power take-off shaft and drawbar and equipped with a hydraulic system, said machine comprising a wheeled container having its top and rear end open, a pulling tongue for the forward end of the wheeled container and pivotally connected with the drawbar of the tractor so that the container may swing vertically about its wheels, a transverse rotary scraper cylinder rotatably mounted upon the rear end of the container adjacent the bottom of the container and having radial blades which engage the ground to scrape the same, the blades propelling the scraped material into the rear end of the container, a longitudinal rotary shaft mounted upon the top of the container, said longitudinal shaft being operatively connected with the scraper cylinder to turn it, a telescoping shaft connected with the forward end of said longitudinal shaft and with the power take-off shaft of the tractor, a hydraulic cylinder connected with the forward end of the container near the top of the container and connected with said pulling tongue, the hydraulic cylinder being connected with the hydraulic system of the tractor and serving when actuated to tilt the container about its wheels to raise and lower the rotary scraper cylinder, and means including a vertically swingable plate connected with the container near its bottom to dump the contents thereof upon the ground.

2. A scraper machine for use with a tractor having a power take off shaft and drawbar and equipped with a hydraulic system, said machine comprising a wheeled container having its top and rear end open, a pulling tongue for the forward end of the wheeled container and pivotally connected with the drawbar of the tractor so that the container may swing vertically about its wheels, a transverse rotary scraper cylinder rotatably mounted upon the rear end of the container adjacent the bottom of the container and having radial blades which engage the ground to scrape the same, the blades propelling the scraped material into the rear end of the container, a hydraulic cylinder having one end connected to said pulling tongue and having the other end connected to the forward end of said container adjacent the top thereof, said cylinder being connected with the hydraulic system of the tractor and serving when actuated to tilt said container about its wheels to raise and lower the rotary scraper, means operatively connecting the power take off shaft of the tractor to said scraper cylinder for effecting the rotary movement of the latter, and means including a vertically swingable plate connected with the container adjacent its bottom to dump the contents thereof upon the ground.

3. A scraping machine for use with a tractor having a power take off shaft and drawbar and equipped with a hydraulic system, said machine comprising a wheeled container having its top and rear end open, a pulling tongue for the forward end of the wheeled container and pivotally connected with the drawbar of the tractor so that the container may swing vertically about its wheels, a transverse rotary scraper cylinder rotatably mounted upon the rear end of the container adjacent the bottom of the container and having radial blades which engage the ground to scrape the same, the blades propelling the scraped material into the rear end of the container, a hydraulic cylinder having one end connected to said pulling tongue and having the other end connected to the forward end of said container adjacent the top thereof, said cylinder being connected with the hydraulic system of the tractor and serving when actuated to tilt said container about its wheels to raise and lower the rotary scraper, a telescoping shaft having one end connected to the power take off shaft of the tractor and having the other end operatively connected to said rotary scraper for effecting the rotary movement of the latter, and means including a vertically swingable plate connected with the container adjacent its bottom to dump the contents thereof upon the ground.

CORNELIUS BARTSCH.

REFERENCES CITED

The following references are of record in the file of this patent:

UNITED STATES PATENTS

| Number | Name | Date |
|---|---|---|
| 47,566 | Quimby | May 2, 1865 |
| 645,443 | Weaver | Mar. 13, 1900 |
| 1,515,506 | McNall | Nov. 11, 1924 |
| 2,063,698 | Roe | Dec. 8, 1936 |
| 2,084,887 | Bennett | June 22, 1937 |
| 2,371,154 | Cuthill et al. | Mar. 13, 1945 |

FOREIGN PATENTS

| Number | Country | Date |
|---|---|---|
| 527,621 | France | Oct. 27, 1921 |